(12) United States Patent
Kebukawa et al.

(10) Patent No.: US 11,962,202 B2
(45) Date of Patent: Apr. 16, 2024

(54) MOTOR AND FAN MOTOR

(71) Applicant: MINEBEA MITSUMI Inc., Nagano (JP)

(72) Inventors: Kouji Kebukawa, Kitasaku-gun (JP);
Kentaro Suzuki, Kitasaku-gun (JP);
Wataru Nogamida, Kitasaku-gun (JP);
Yoshihisa Okabuchi, Atsugi (JP);
Takayuki Sugaya, Atsugi (JP);
Takahiro Saito, Atsugi (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/812,528

(22) Filed: Jul. 14, 2022

(65) Prior Publication Data

US 2023/0073481 A1  Mar. 9, 2023

(30) Foreign Application Priority Data

Sep. 7, 2021 (JP) ................................. 2021-145727

(51) Int. Cl.
*H02K 11/25* (2016.01)
*H02K 7/14* (2006.01)
*H02K 11/215* (2016.01)
*H02K 21/16* (2006.01)

(52) U.S. Cl.
CPC ......... *H02K 11/25* (2016.01); *H02K 2213/03* (2013.01)

(58) Field of Classification Search
CPC .......... H02K 11/25; H02K 7/14; H02K 21/16; H02K 11/215
USPC ................... 310/40 MM, 60 R, 62, 63, 68 C
See application file for complete search history.

(56) References Cited

U.S. PATENT DOCUMENTS

| 6,529,135 B1 | 3/2003 | Bowers et al. |
| 6,617,713 B1 | 9/2003 | Li |
| 7,339,295 B2 | 3/2008 | Knauff |
| 2006/0017336 A1* | 1/2006 | Knauff .................. H02K 11/25 310/68 C |

FOREIGN PATENT DOCUMENTS

| DE | 100 49 506 A1 | 4/2001 |
| DE | 103 05 368 A1 | 8/2004 |
| JP | 2015-231295 A | 12/2015 |
| JP | 2020-133889 A | 8/2020 |

OTHER PUBLICATIONS

Extended European Search Report dated Feb. 1, 2023 for corresponding European Application No. EP22193605.7.

* cited by examiner

*Primary Examiner* — Jose A Gonzalez Quinones
(74) *Attorney, Agent, or Firm* — Pearne & Gordon LLP

(57) ABSTRACT

A motor includes a shaft, a rotor, a stator including a coil and opposed to the rotor, and a bearing configured to support the shaft. In addition, the motor further includes a first temperature sensor disposed farther toward an outer periphery side than the coil, and a second temperature sensor disposed farther toward an inner periphery side than the coil.

10 Claims, 12 Drawing Sheets

MOTOR AND FAN MOTOR

CROSS-REFERENCE TO RELATED APPLICATIONS

This application claims the benefit of Japanese Application No. 2021-145727, filed Sep. 7, 2021, the entire disclosure of which is hereby incorporated herein by reference.

TECHNICAL FIELD

The present invention relates to a motor and a fan motor.

BACKGROUND ART

A technique of detecting defects of a bearing by detecting variation of frictional heat generated from the bearing by using a temperature sensor in rotating electrical machinery such as a motor and a generator is known.

CITATION LIST

Patent Literature

[PTL 1] JP 2015-231295 A
[PTL 2] JP 2020-133889 A

SUMMARY OF INVENTION

Technical Problem

In rotating electrical machinery, when a defect is caused at a bearing under the influence of heat generated from a coil, it is difficult to correctly detect the influence of the heat generation caused by the defect of the bearing. As such, a motor capable of more correctly detecting the temperature change of a bearing is desired.

An object of an aspect is to provide a motor and a fan motor capable of correctly detecting the temperature change of a bearing.

Solution to Problem

According to an aspect, a motor includes a shaft, a rotor, a stator including a coil and opposed to the rotor, and a bearing configured to support the shaft. In addition, the motor further includes a first temperature sensor disposed farther toward an outer periphery side than the coil, and a second temperature sensor disposed farther toward an inner periphery side than the coil.

According to the aspect, the temperature change of the bearing can be more correctly detected.

DESCRIPTION OF EMBODIMENTS

Figure 1:
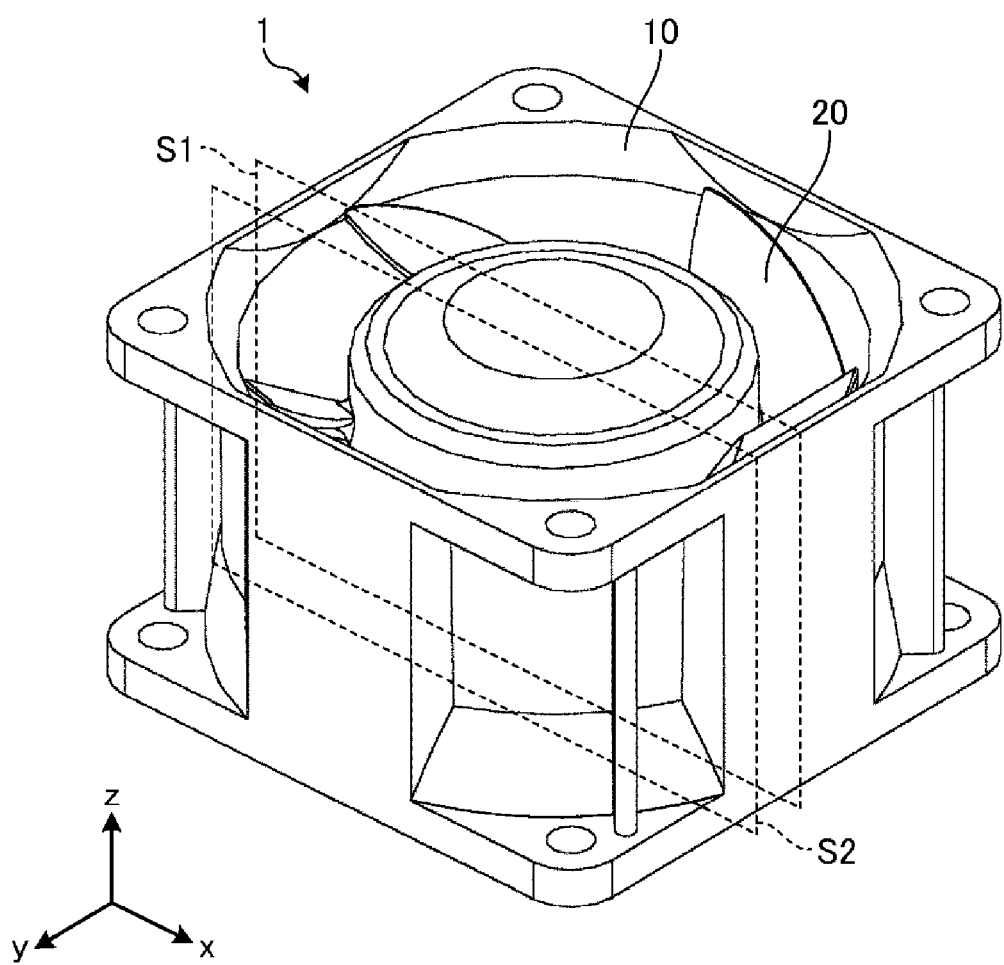
FIG. 1 is a diagram illustrating an example of a fan motor of an embodiment.

An embodiment of a motor and a fan motor disclosed in this application is described below with reference to the drawings. Note that in the drawings, the dimensional relationship of elements and the ratio of the elements may not be drawn to scale. The dimensional relationship and the ratio may be different among the drawings. In the drawings, an XYZ coordinate system with the axis direction of a motor 30 described later set to the Z axis positive direction may be used for the sake of clarity of description.

Embodiments

Figure 2:
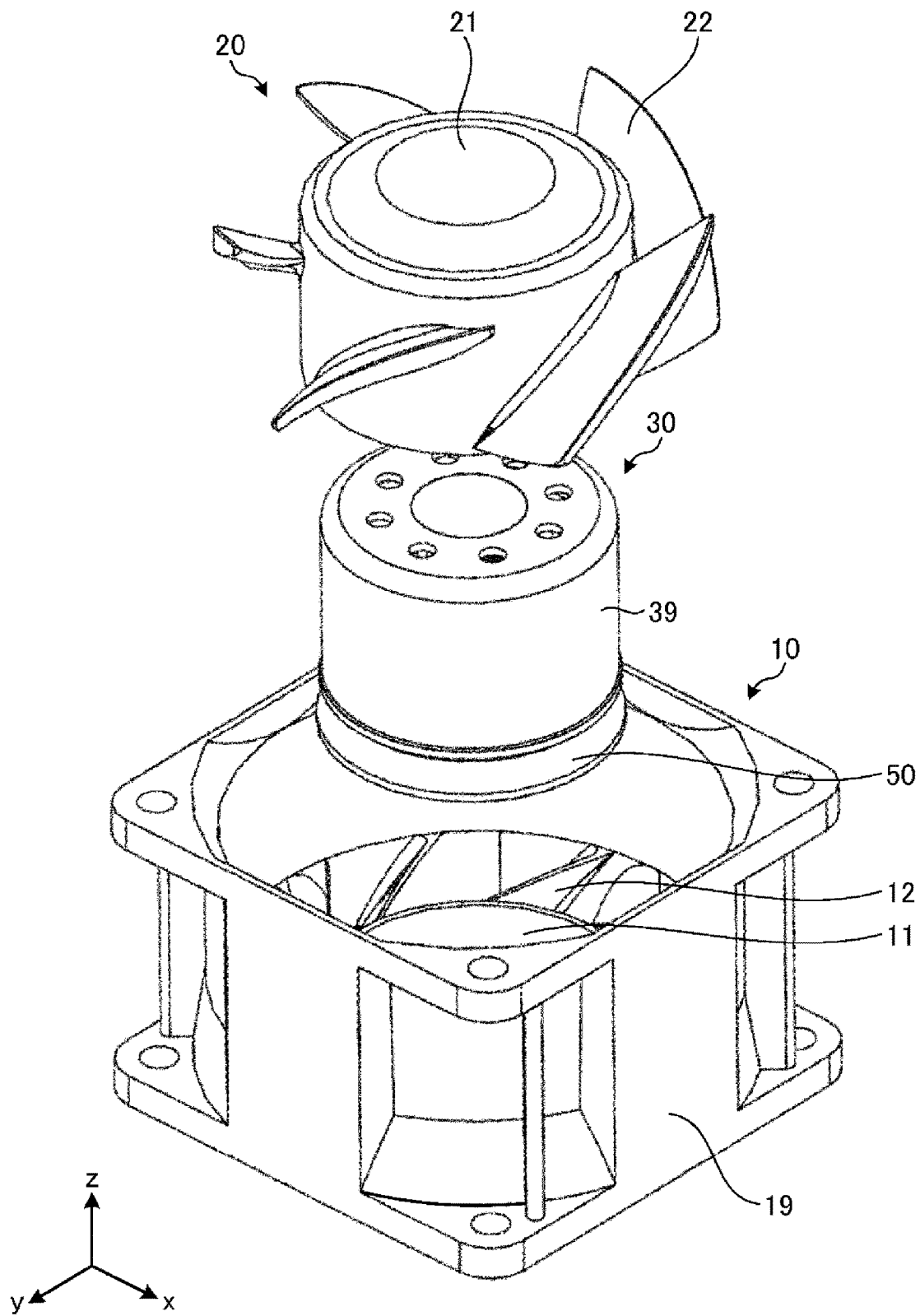
FIG. 2 is an exploded perspective view illustrating an example of the fan motor of the embodiment.

First, a fan motor of the embodiment is described with reference to FIGS. 1 and 2. FIG. 1 is a diagram illustrating an example of a fan motor of the embodiment. FIG. 2 is an exploded perspective view illustrating an example of the fan motor. As illustrated in FIGS. 1 and 2, a fan motor 1 of the embodiment includes a housing 10, an impeller 20, and the motor 30. The fan motor 1 is used as a fan motor for a server, for example.

The housing 10 and the impeller 20 are formed of a metal such as resin or aluminum, for example. The impeller 20 and the motor 30 are housed into the housing 10 from the Z-axis positive direction side. Note that in FIG. 1, the motor 30 is covered with the impeller 20 and is not visible.

The housing 10 includes a bottom surface 11, a plurality of stationary blades 12, and a side wall 19. The side wall 19 is formed approximately parallel to the Z-axis direction. The plurality of stationary blades 12 are located on the lower side in the axial direction, and extend in the radial direction with the bottom surface 11 as the center.

As illustrated in FIG. 2, the impeller 20 includes a hub 21 and a plurality of rotor blades 22. As illustrated in FIG. 2, the impeller 20 is mounted at the motor 30 from the Z-axis direction positive direction side, and turns in conjunction with the motor 30 with the Z axis as the rotation axis.

Figure 3:
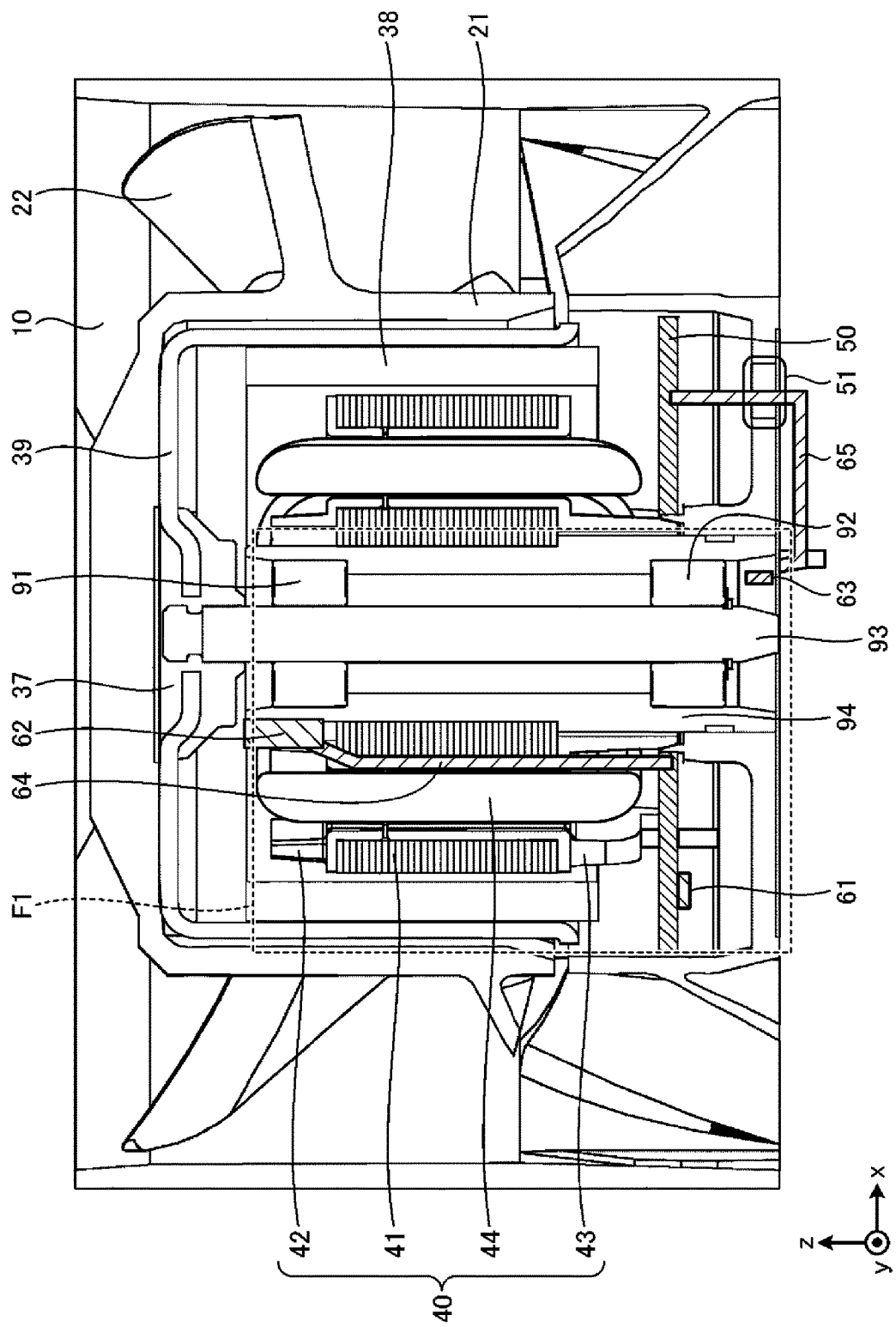
FIG. 3 is a sectional view illustrating an example of the fan motor of the embodiment.

The motor 30 is, for example, an outer rotor type motor. As illustrated in FIG. 3, a rotor yoke 39 of the motor 30 turns a shaft 93 supported by bearings 91 and 92 as the rotation axis. FIG. 3 is a sectional view illustrating an example of the fan motor of the embodiment. FIG. 3 illustrates a cross section taken along a plane 51 of FIG. 1.

As illustrated in FIG. 3, the motor 30 includes a stator 40, a magnet 38, the rotor yoke 39, and a substrate 50. As illustrated in FIG. 3, the rotor yoke 39 of the embodiment is formed in a cup shape covering the stator 40 from the Z-axis positive direction side. In addition, the motor 30 further includes the bearings 91 and 92, the shaft 93, and a bearing liner 94. Note that the rotor yoke 39 is an example of the rotor, and the bearing liner 94 is an example of the holding member.

The stator 40 includes a stator core 41, insulators 42 and 43, and a coil 44. The stator core 41 is formed by stacking a plurality of plate-shaped metal members such as silicon steel sheets and soft magnetic steel sheets such as electromagnetic steel sheets in the Z-axis direction, for example. The insulators 42 and 43 are formed of an insulator such as a resin, for example. The insulators 42 and 43 are mounted to the stator core 41 from the positive direction side and the negative direction side in the Z-axis direction, respectively. The coil 44 is wound around the stator core 41 through the insulators 42 and 43. Note that the insulators 42 and 43 may be a coating with electrical insulation.

The rotor yoke 39 is coupled to the upper end of the shaft 93 through a boss part 37, for example. In this case, the shaft 93 turns in conjunction with the rotor yoke 39. The magnet 38 is fixed to the inner periphery side of the rotor yoke 39. The magnet 38 and the rotor yoke 39, and the stator 40 are opposed to each other in the radial direction. The rotor yoke 39 is formed of a metal such as iron. In addition, the rotor yoke 39 need not be a cup-shaped integrated component, and a member coupled with the upper end of the shaft 93 and a member disposed at the outer periphery of the magnet 38 may be separate members.

An electronic component, not illustrated in the drawing, for performing control and power feeding of the motor 30, and the like are disposed at the substrate 50. The substrate 50 is formed of a resin, for example. The electronic component includes an integrated circuit (IC), not illustrated in the drawing, that acquires detection results output from temperature sensors 61, 62 and 63 described later, and the like, for example.

The bearings 91 and 92 are ball bearings, and support the shaft 93 in the radial direction, for example. Note that in the following description, the bearings 91 and 92 may be simply referred to as a bearing 90 for collective description, and may be referred to as the first bearing 91 and the second bearing 92 for differentiation.

The bearing liner 94 supports the shaft 93 through the bearings 91 and 92. The bearing liner 94 is inserted in the Z-axis direction into the center portion of the stator 40 in the radial direction, for example. The bearing liner 94 is formed of a metal such as brass, for example.

The motor 30 of the embodiment includes a temperature sensor to detect defects of the bearing 90. As illustrated in FIG. 3, the motor 30 of the embodiment includes a plurality of the temperature sensors 61, 62 and 63. Note that in the following description, the plurality of the temperature sensors 61, 62 and 63 may be simply referred to as the temperature sensor 60 for collective description, and may be referred to as the first temperature sensor 61, the second temperature sensor 62, and the third temperature sensor 63 for differentiation. Each of the first temperature sensor 61, the second temperature sensor 62, and the third temperature sensor 63 outputs a detected temperature to a motor controlling IC described later and not illustrated in the drawing.

Figure 4:
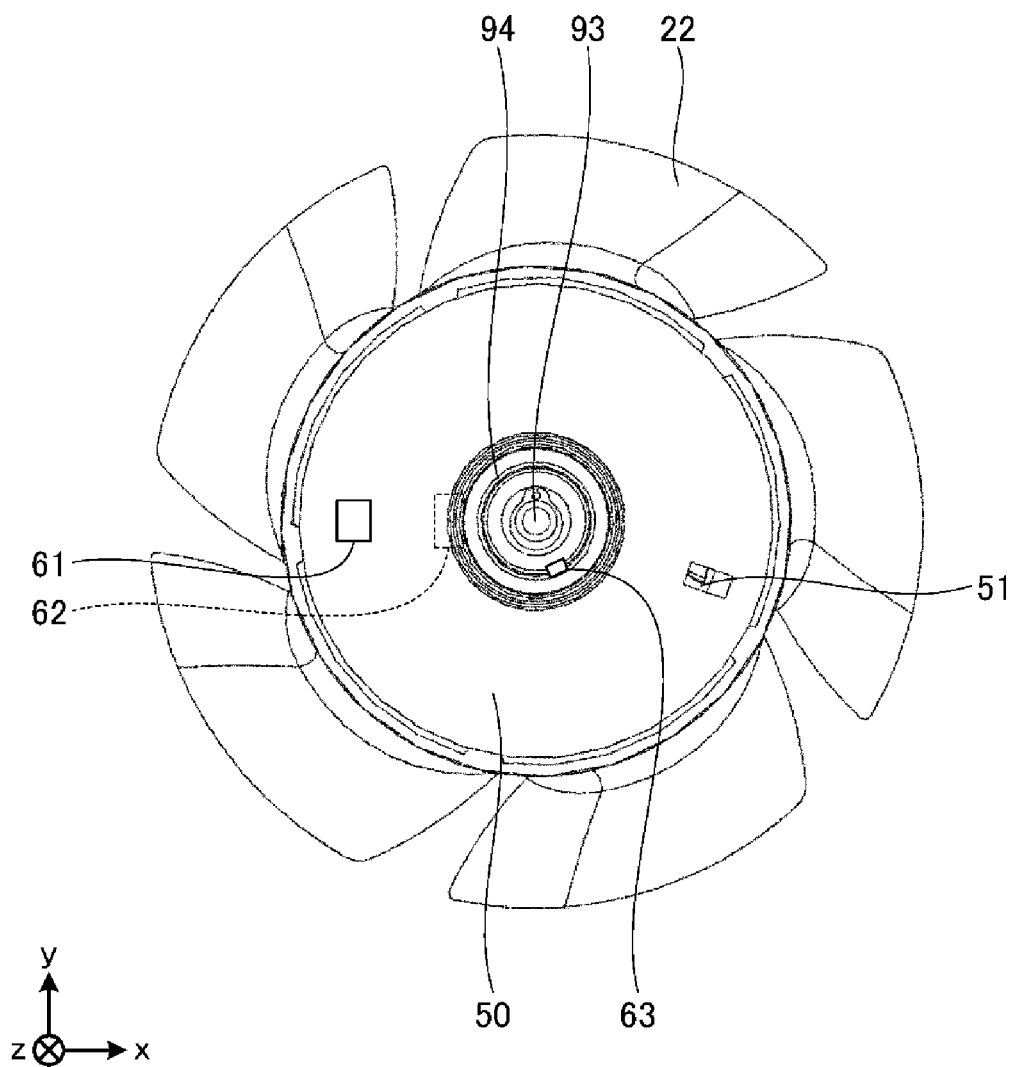
FIG. 4 is a bottom view illustrating an example of a motor with an impeller attached to the motor of the embodiment.
Figure 5:
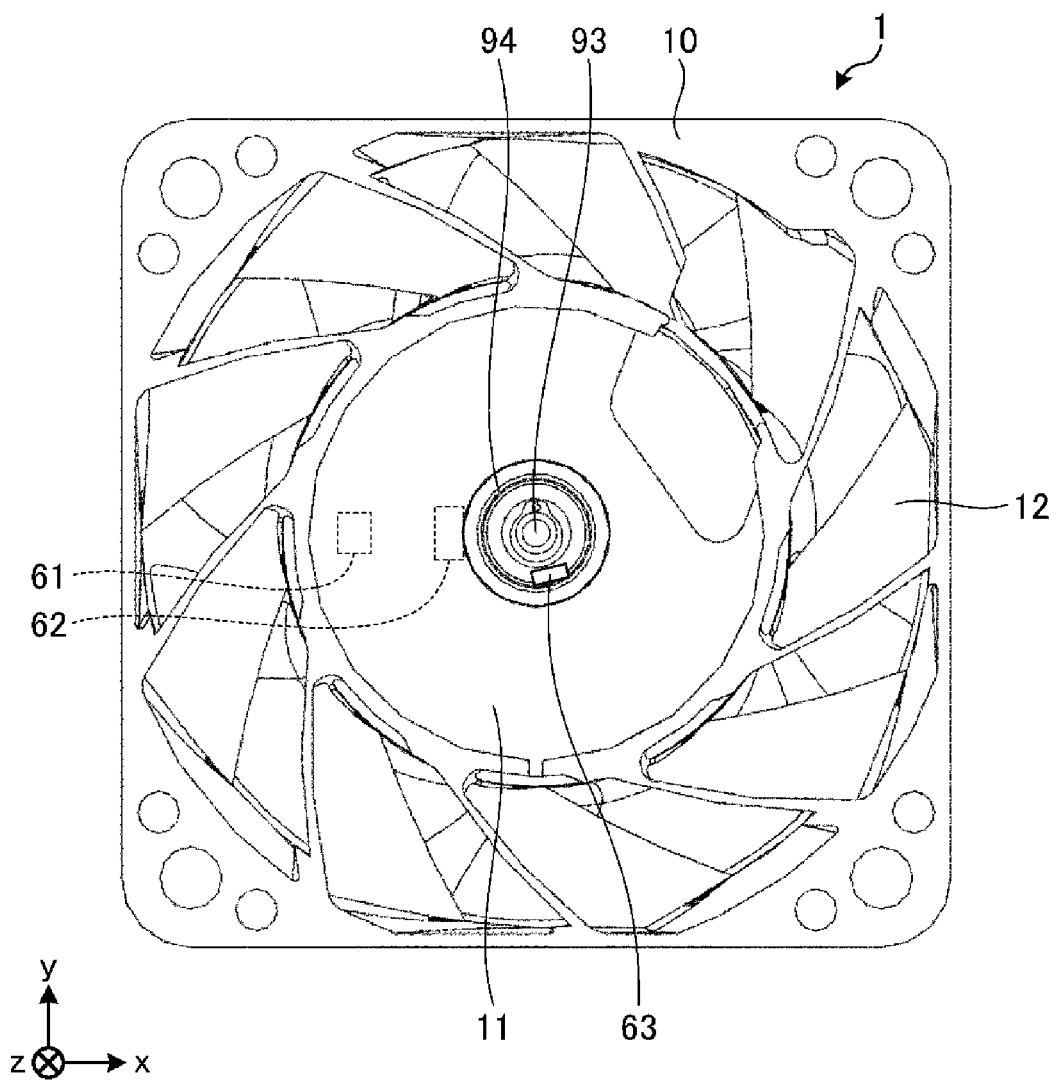
FIG. 5 is a bottom view illustrating an example of the fan motor of the embodiment.
Figure 6:
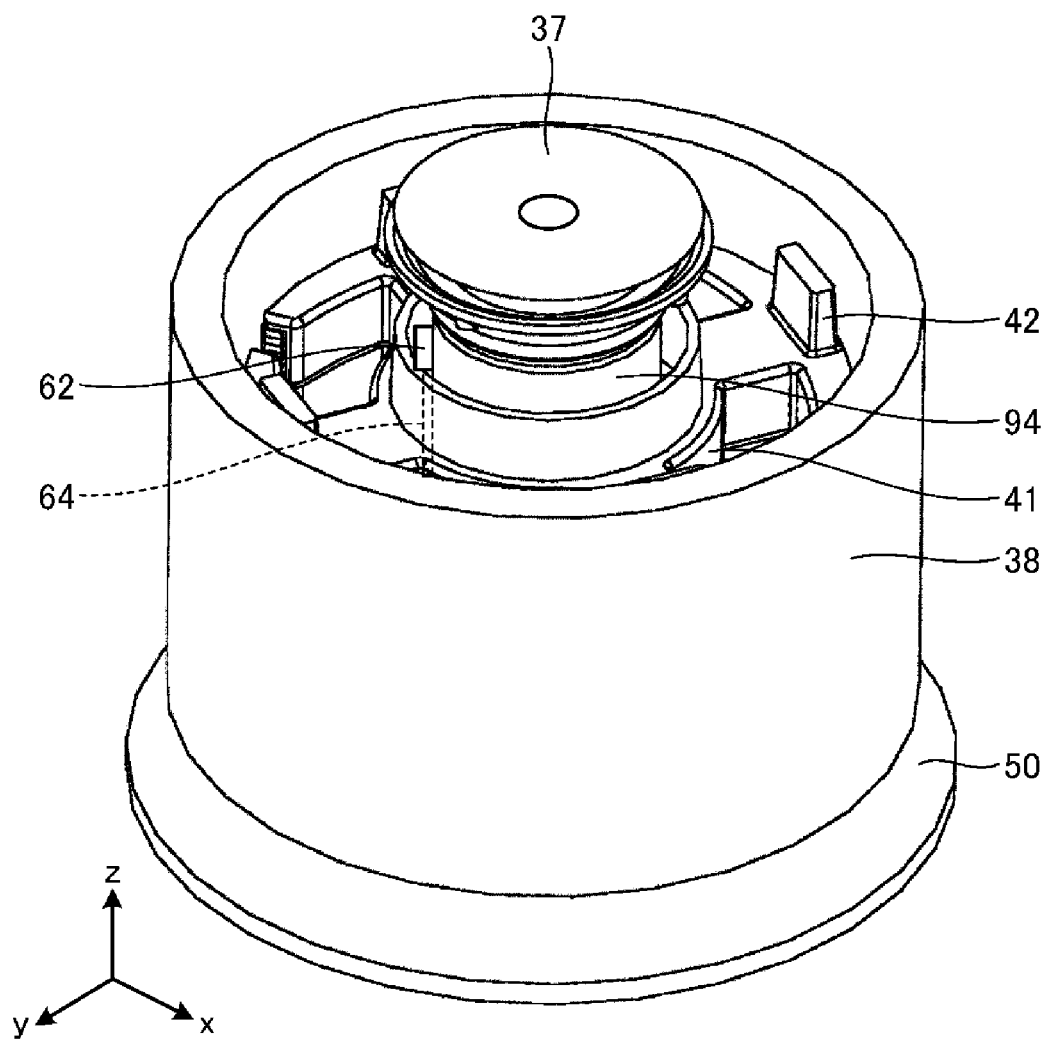
FIG. 6 is a perspective view illustrating an example of a motor with a rotor yoke detached from the motor in the embodiment.
Figure 7:
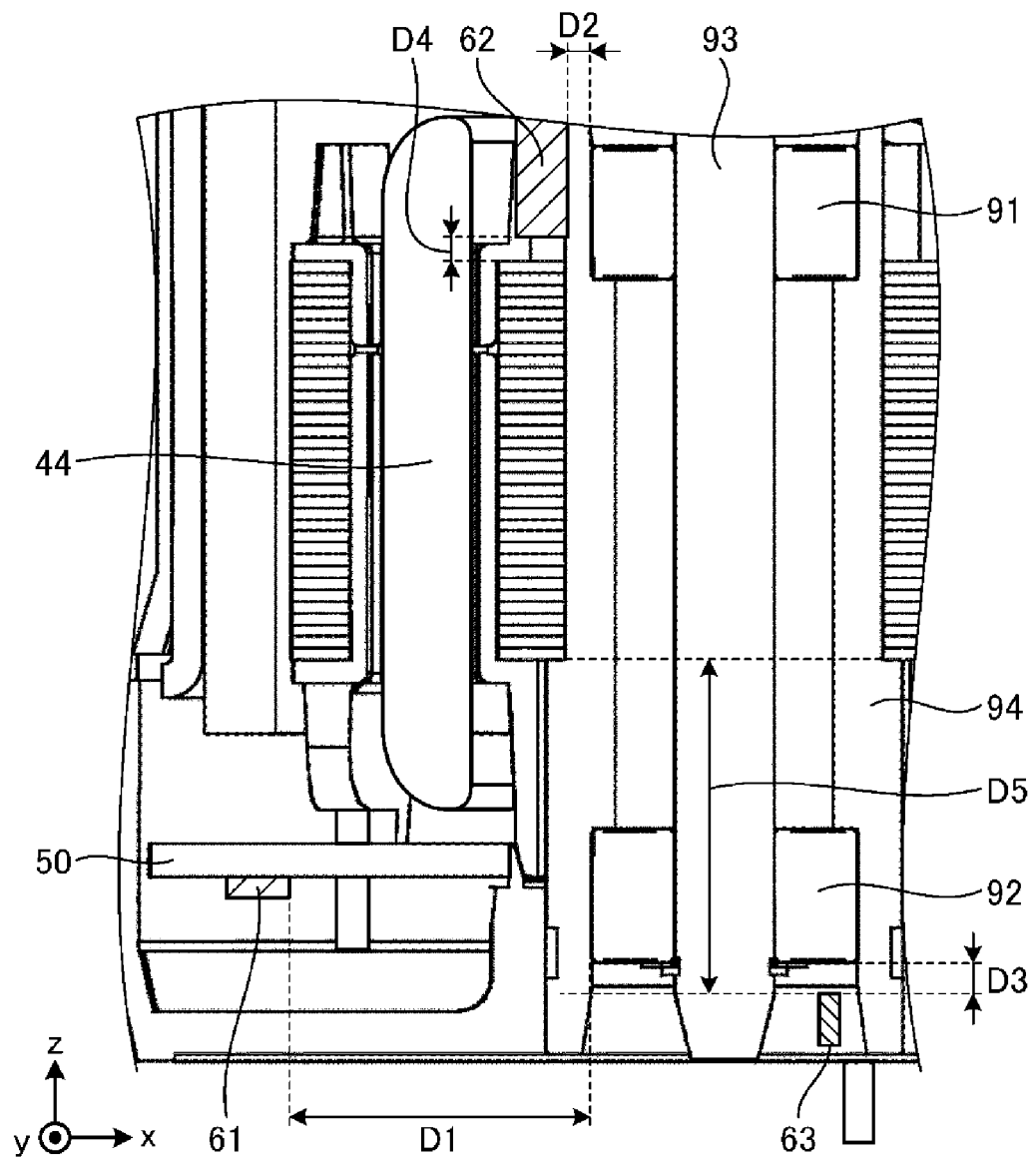
FIG. 7 is an enlarged sectional view illustrating an example of a fan motor of the embodiment.

Positional relationships of the temperature sensors 61, 62 and 63 are described below with reference to FIGS. 4, 5, 6, and 7. FIG. 4 is a bottom view illustrating an example of a motor with an impeller attached to the motor of the embodiment. FIG. 5 is a bottom view illustrating an example of the fan motor of the embodiment. FIG. 6 is a perspective view illustrating an example of a motor with a rotor yoke detached from the motor in the embodiment. FIG. 7 is an enlarged sectional view illustrating an example of the fan motor of the embodiment. FIG. 7 is an enlarged view of a portion illustrated in a frame F1 in FIG. 3.

As illustrated in FIGS. 4 and 7, the first temperature sensor 61 is disposed farther toward the outer periphery side than the coil 44 in the radial direction, for example. On the other hand, the second temperature sensor 62 is disposed farther toward the inner periphery side than the coil 44 in the radial direction, for example.

The first temperature sensor 61 is disposed at the substrate 50 (e.g., a first member), for example. Specifically, at least the substrate 50 made of resin is interposed between the first temperature sensor 61 and the bearings 91 and 92. In addition, the distance between the first temperature sensor 61 and the coil 44 is smaller than the distance between the first temperature sensor 61 and the bearings 91 and 92.

In addition, the second temperature sensor 62 is disposed at the bearing liner 94 (e.g., a second member) in the embodiment. To be more specific, the second temperature sensor 62 is disposed at the Z-axis direction positive direction side of the bearing liner 94, e.g., at a position opposed to the first bearing 91 in the radial direction. More specifically, the second temperature sensor 62 is opposed to the first bearing 91 through the bearing liner 94 in the radial direction.

In addition, in the embodiment, the third temperature sensor 63 is further disposed inside the motor 30. Inside the motor 30, the third temperature sensor 63 is disposed in contact with any of the members. For example, the third temperature sensor 63 is disposed at the Z-axis direction negative direction side and on the inner periphery side of the bearing liner 94 as illustrated in FIG. 5. Note that in FIG. 5, the first temperature sensor 61 and the second temperature sensor 62 are not visible. Note that the third temperature sensor 63 need not be disposed at the position described in the example, as long as the third temperature sensor 63 is disposed inside the motor.

As illustrated in FIG. 7, in the embodiment, a shortest distance D1 between the first temperature sensor 61 and the closer one of the bearings 91 and 92 is greater than a shortest distance D2 between the second temperature sensor 62 and the closer one of the bearings 91 and 92, and is greater than a shortest distance D3 between the third temperature sensor 63 and the closer one of the bearings 91 and 92. In addition, in the embodiment, as illustrated in FIG. 7, a shortest distance D5 between the third temperature sensor 63 and the stator 40 is greater than a shortest distance D4 between the second temperature sensor 62 and the stator 40.

In addition, in the embodiment, the resin making up the substrate 50 formed with the first temperature sensor 61, and the bearing liner 94 made of metal disposed with the second temperature sensor 62 and the third temperature sensor 63 are different from each other in terms of thermal capacity and thermal conductivity. For example, the thermal conductivity of the substrate 50 is smaller than 1 (W/mK), while the thermal conductivity of the bearing liner 94 is 10 (W/mK) or greater.

In addition, in the embodiment, the motor controlling IC, not illustrated in the drawing, disposed with the substrate 50 may include three temperature sensor terminals. In this case, the first temperature sensor 61, the second temperature sensor 62, and the third temperature sensor 63 are directly connected to the same motor controlling IC without interposing other members such as a resistor.

For example, the second temperature sensor 62 and the third temperature sensor 63 disposed separately from the substrate 50 are connected to the motor controlling IC through a wiring line 64 and a wiring line 65, respectively. Note that the wiring line 64 is passed through a gap of teeth protruding in the radial direction in the stator core 41, and the wiring line 65 is passed through a hole 51 formed at the substrate 50 as illustrated in FIGS. 3 and 6, for example.

In the embodiment, when a defect occurs at the bearing 90, friction is more likely to occur due to degradation of grease and/or leakage of oil at portions between the shaft 93 and the bearing 90, between the bearing 90 and the bearing liner 94, inside the bearing 90 and the like. In this case, the temperature sensor 60 detects the temperature rise due to the friction, and thus the defect of the bearing 90 can be detected.

On the other hand, the temperature sensor 60 also detects heat generated at the coil 44. As such, it may be difficult to identify whether a temperature rise is due to heat generated by the coil 44 or a defect of the bearing 90. For example, when a defect is caused at only one bearing, the temperature increases only at the periphery of the bearing, and therefore it is relatively easy to detect the defect. When defects are simultaneously caused at both the first bearing 91 and the second bearing 92, the temperature increases simultaneously at both the bearings 91 and 92, and therefore it is more difficult to detect the defects.

In view of this, in the embodiment, the first temperature sensor 61 disposed at a position close to the coil 44 and the second temperature sensor 62 disposed at a position close to the bearing 91 or 92 are provided. In this manner, a temperature change of the bearing 91 or 92 can be correctly detected on the basis of a detection result of the first temperature sensor 61 strongly influenced by the temperature change of the coil 44 and a detection result of the second temperature sensor 62 influenced by the temperature change of the bearing 91 or 92 in addition to the temperature change of the coil 44 even in the case where defects are simultaneously generated at the first bearing 91 and the second bearing 92, for example.

Figure 8:
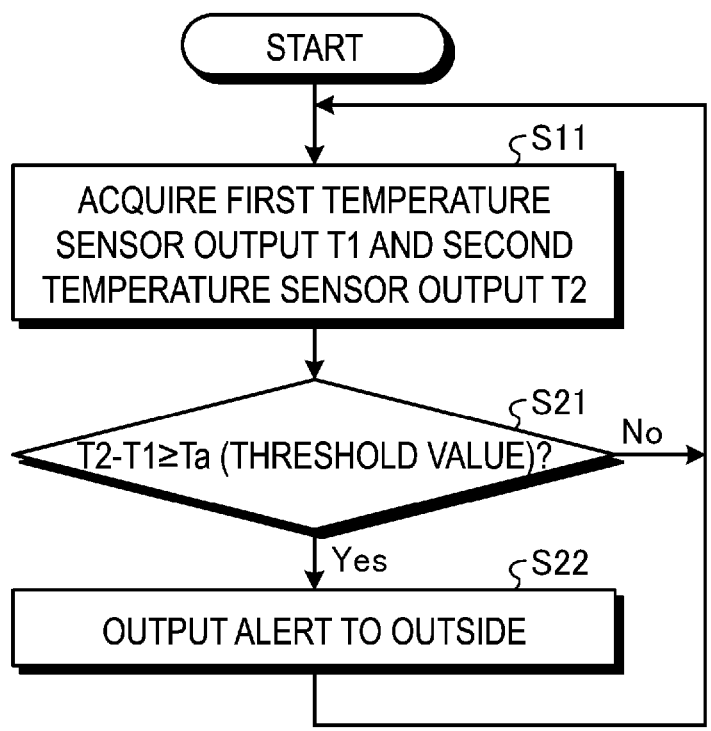
FIG. 8 is a flowchart illustrating an example of an output process of the embodiment.

In the embodiment, a processing section of the motor controlling IC directly connected to the first temperature sensor 61, the second temperature sensor 62 and the third temperature sensor 63 outputs an output signal to the outside of the motor on the basis of the detection result of the first temperature sensor 61 and the detection result of the second temperature sensor 62, for example. The process of outputting the signal on the basis of the temperature change is described with reference to FIG. 8. FIG. 8 is a flowchart illustrating an example of an output process of the embodiment. As illustrated in FIG. 8, the processing section not illustrated in the drawing acquires a detection result T1 output from the first temperature sensor 61 and a detection result T2 output from the second temperature sensor 62 (step S11).

Next, the processing section calculates a difference T2-T1 between the acquired detection result T2 and detection result T1. Then, whether the calculated difference T2-T1 is greater than threshold value Ta is determined (step S21).

When the difference T2-T1 is determined to be smaller than a threshold value Ta (step S21, No), the processing section returns to step S11, and continues the acquisition of the detection results T1 and T2. On the other hand, when the difference T2-T1 is determined to be greater than the threshold value Ta (step S21, Yes), the processing section outputs an alert to an external apparatus (step S22).

Note that the processing section may further acquire a detection result T3 output from the third temperature sensor 63 in addition to the detection results T1 and T2. In this case, the processing section may compare, with the threshold value Ta, the larger one of a difference T3-T1 between the detection results T1 and T3 and the difference T2-T1, for example.

As described above, the motor 30 of the embodiment includes the shaft 93, a rotor yoke 39, the coil 44, the stator 40 opposed to the rotor yoke 39, and the bearing 91 supporting the shaft 93. In addition, the motor 30 includes the first temperature sensor 61 disposed farther toward the outer periphery side than the coil 44, and the second temperature sensor 62 disposed farther toward the inner periphery side than the coil 44. With this configuration, the temperature change of the bearing can be more correctly detected by detecting the temperature inside the motor by using the first temperature sensor 61 less influenced by the temperature change of the bearing 91 or 92 and the second temperature sensor more influenced by the temperature change of the bearing.

Modification Examples

While the configuration of the embodiment is described above, the embodiment is not limited to this. For example, the number of the bearings for supporting the shaft 93 is not limited to two, and may be one, or three or more.

Figure 9:
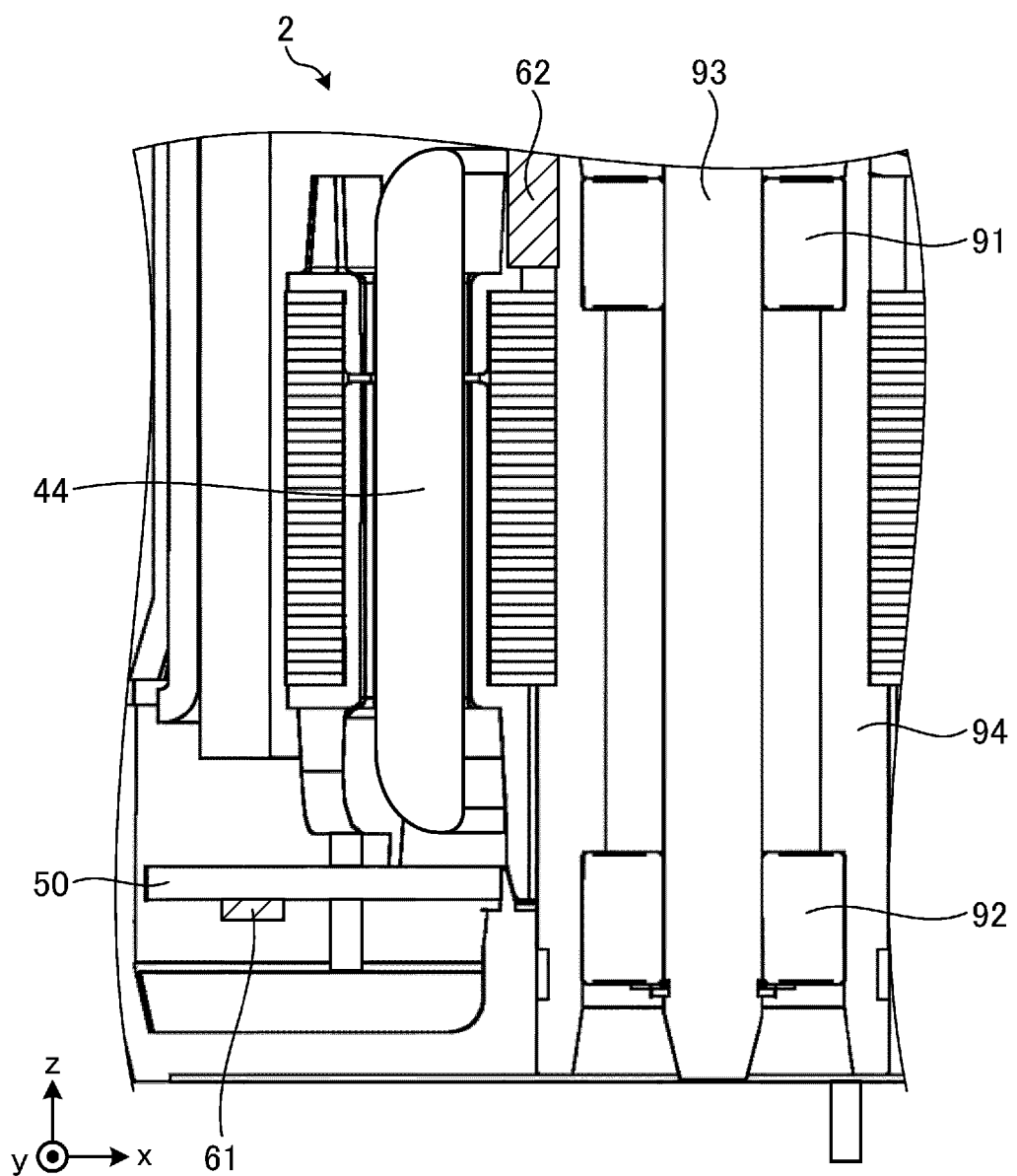
FIG. 9 is an enlarged sectional view illustrating an example of a fan motor of a first modification example.

In addition, while the three temperature sensors 61, 62 and 63 are provided in the above-described configuration, four or more temperature sensors may be provided. In addition, in a first modification example, the first and second temperature sensors are provided while the third temperature sensor 63 is not provided, i.e., only two temperature sensors are provided as illustrated in FIG. 9. FIG. 9 is an enlarged sectional view illustrating an example of a fan motor of the first modification example. As illustrated in FIG. 9, a fan motor 2 of the first modification example includes the first temperature sensor 61 and the second temperature sensor 62, but does not include the third temperature sensor 63.

For example, when the thermal conductivity of the bearing liner 94 is sufficiently high, the temperature sensor may be provided only at one of a portion near the first bearing 91 or a portion near the second bearing 92 in the Z-axis direction. In this case, the third temperature sensor 63 may be omitted.

Figure 10:
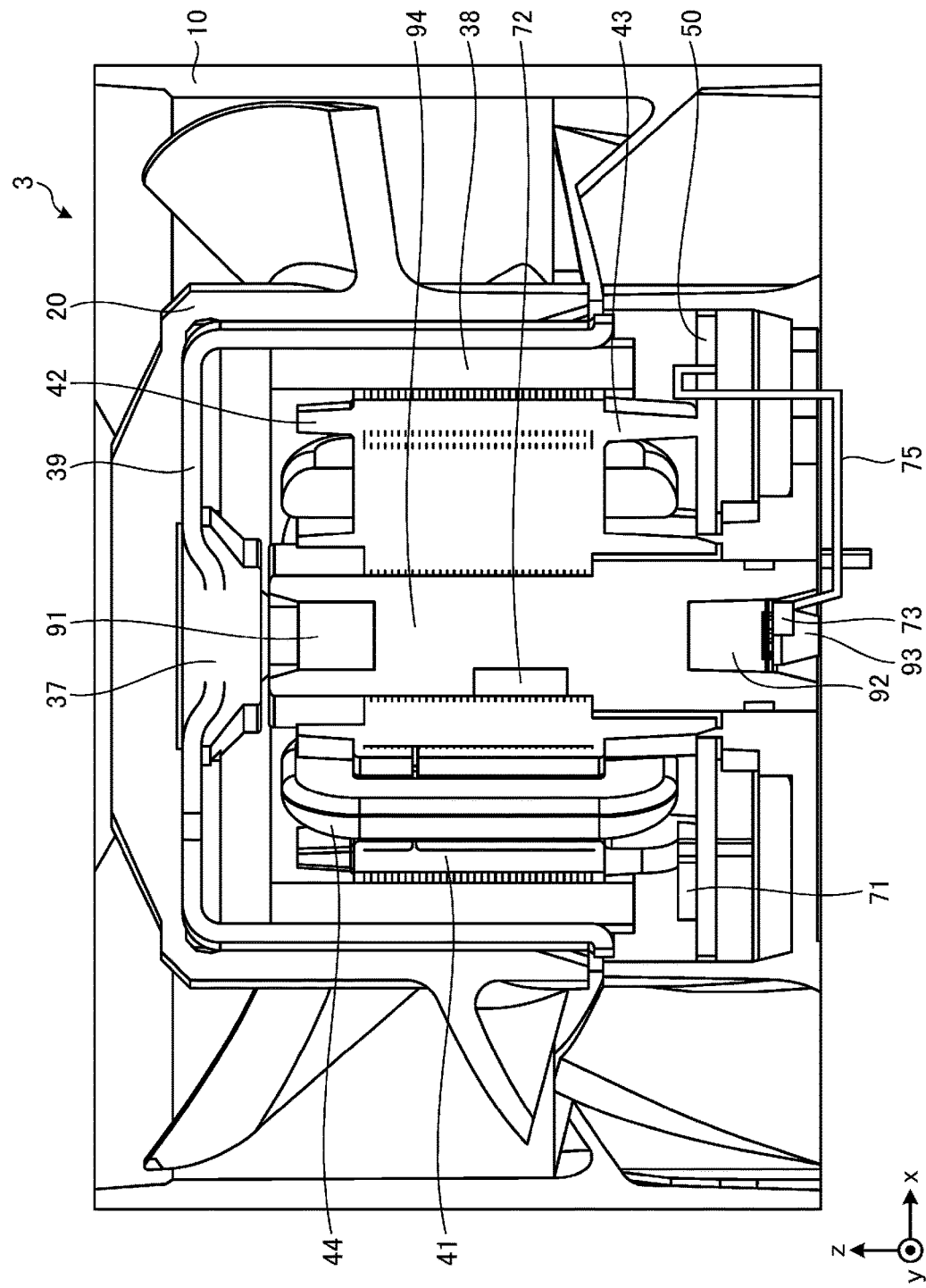
FIG. 10 is a sectional view illustrating an example of a fan motor of a second modification example.

In addition, the position disposed with each temperature sensor is not limited to the position described in the embodiment. For example, in the embodiment, the first temperature sensor is disposed at the surface (lower side surface) of the substrate 50 on the negative direction side in the Z-axis direction, but the present invention is not limited to this, and the first temperature sensor may be disposed at the surface (upper side surface) on the opposite side of the substrate 50 as illustrated in FIG. 10. FIG. 10 is a sectional view illustrating an example of a fan motor of a second modification example. FIG. 10 illustrates a cross section taken along a plane S2 of FIG. 1.

In addition, as illustrated in FIG. 10, in a fan motor 3 of the second modification example, the second temperature sensor 72 is disposed at an intermediate position between the first bearing 91 and the second bearing 92 in the Z-axis direction. Note that when disposed separately from the substrate 50, the temperature sensor preferably transmits sensor information in a wireless manner in order to avoid complicated wiring. In this manner, the second temperature sensor 72 may be disposed at the inner periphery side or the outer periphery side of the bearing liner 94. In addition, the second temperature sensor 72 may be disposed in contact with the bearing 90 as long as the second temperature sensor 72 is disposed at a position the temperature change of the bearing 90 can be determined.

In addition, it suffices that the third temperature sensor 73 be disposed at any of the members of the motor, and may be disposed at an end portion of the bearing 90 in the axis direction and the like as illustrated in FIG. 10, for example.

Also in this case, the third temperature sensor 73 is connected to the motor controlling IC not illustrated in the drawing through a wiring line 75 passing through the hole 51 of the substrate 50, for example.

Figure 11:
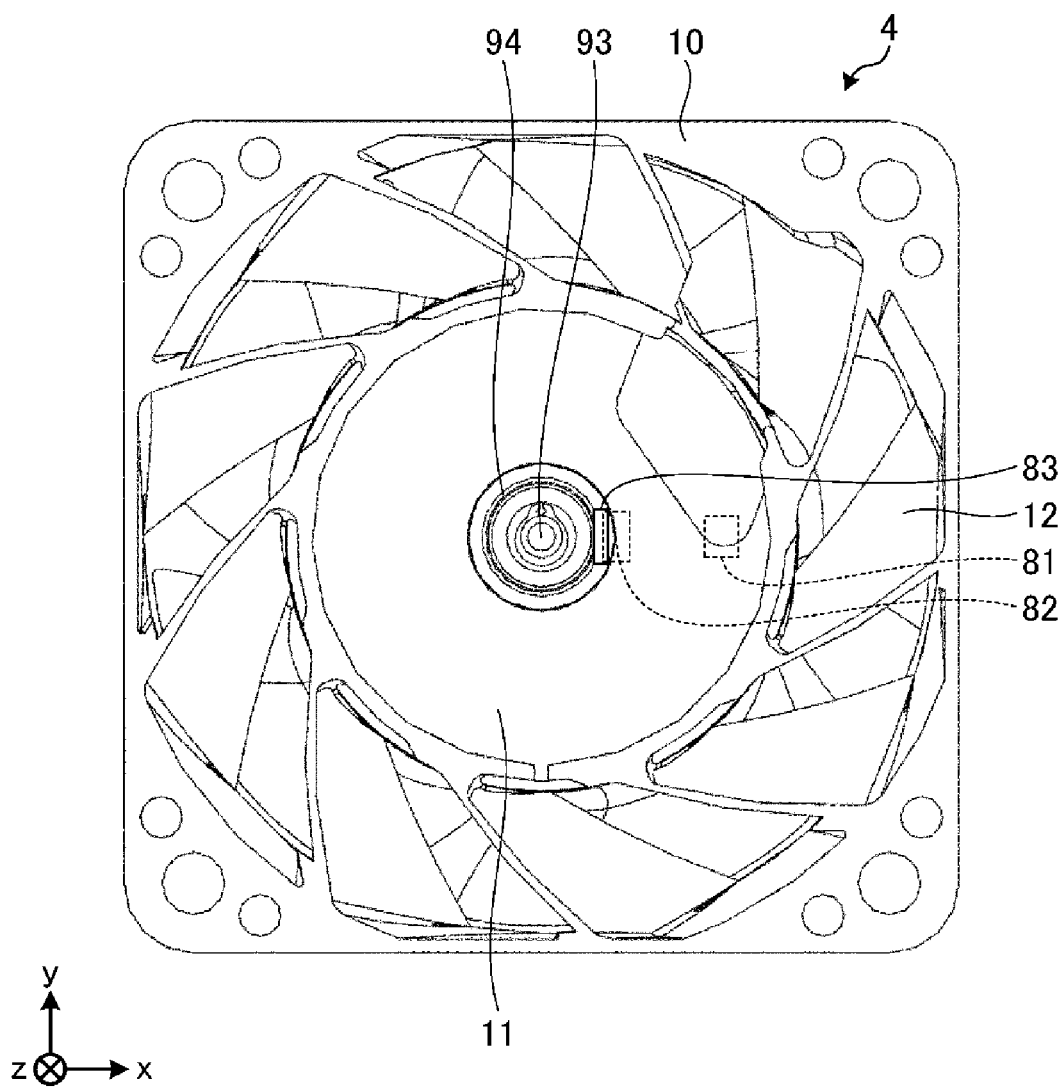
FIG. 11 is a bottom view illustrating an example of a fan motor of a third modification example.

In addition, the positional relationship of each temperature sensor in the circumferential direction is also not limited to the relationship described in the embodiment. FIG. 11 is a bottom view illustrating an example of a fan motor of a third modification example. As illustrated in FIG. 11, the second temperature sensor 82 and the third temperature sensor 83 disposed separately from each other in the Z-axis direction may be disposed at overlapping positions in plan view. In addition, the first temperature sensor 61, the second temperature sensor 82 and the third temperature sensor 83 may be disposed in substantially the same direction in the circumferential direction.

In addition, in the embodiment, the processing section not illustrated in the drawing acquires the detection results T1 and T2 and outputs an alert based on the calculated result of the difference T2-T1, but the embodiment is not limited to this. For example, the processing section may output the difference T2-T1 as is without determining whether to output the alert.

Figure 12:
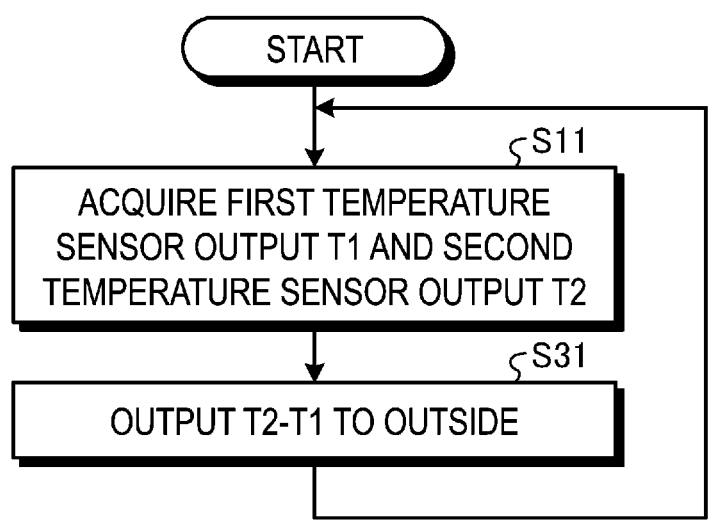
FIG. 12 is a flowchart illustrating an example of an output process of a fourth modification example.

FIG. 12 is a flowchart illustrating an example of an output process of a fourth modification example. As illustrated in FIG. 12, when acquiring the detection result T1 output from the first temperature sensor 61 and the detection result T2 output from the second temperature sensor 62 (step S11), the processing section of the fourth modification example not illustrated in the drawing calculates the difference T2-T1 between the acquired detection result T2 and detection result T1. Then, the processing section outputs the calculated difference T2-T1 to an external apparatus as is (step S31).

With this configuration, the processing section need not store the threshold value Ta, and thus the configuration of the motor can be simplified.

In addition, the motor 30 may output the detection results T1 and T2 as is to the outside without calculating the difference T2-T1. With this configuration, the processing section for calculating the difference T2-T1 of the detection result need not be disposed at the motor, and thus the configuration of the motor can be further simplified.

In addition, while the two bearings 91 and 92 are held at the same bearing liner 94 in the embodiment, the embodiment is not limited to this. For example, the first bearing 91 and the second bearing 92 may be held at respective holding members. Also in this case, it is preferable that the plurality of holding members be composed of the same material and in contact with each other. In addition, the holding member may be formed of iron or another material other than brass as long as the holding member is composed of a material with high thermal conductivity.

In addition, another resin component other than the substrate 50 may be interposed between the first temperature sensor 61 and the bearing 91 or 92.

In addition, the second temperature sensor 62 and the third temperature sensor 73 may be in direct contact with the bearing 91.

Note that the part the motor 30 is mounted is not limited to the fan motor 1, and the motor 30 may be mounted at other external apparatuses. Further, the temperature sensor described in the embodiment and the modification examples may be mounted at other rotating electrical machinery such as a generator instead of a motor.

Embodiments and modification examples of the present invention have been described, but the present invention is not limited to the embodiments and modification examples, and various modifications are possible without departing from the spirit of the present invention. Various modifications within a scope not departing from the gist are included in the technical scope of the present invention, and this is obvious to a person having skill in the art from the description of the claims.

REFERENCE SIGNS LIST 1, 2, 3 Fan motor
10 Housing
11 Bottom surface
12 Stator blade
19 Side wall
20 Impeller
21 Hub
22 Rotor blade
30 Motor
37 Boss part
38 Magnet
39 Rotor yoke
40 Stator
41 Stator core
42, 43 Insulator
44 Coil
50 Substrate
61, 62, 63, 72, 73, 81, 82, 83 Temperature sensor
64, 65, 75 Wiring line
91, 92 Bearing
93 Shaft
94 Bearing liner

The invention claimed is:

1. A motor comprising:
a shaft;
a rotor;
a stator including a coil and opposed to the rotor;
a bearing configured to support the shaft;
a first member disposed farther toward an outer periphery side than the coil,
a first temperature sensor disposed in contact with the first member; and
a second member disposed farther toward an inner periphery side than the coil,
a second temperature sensor disposed in contact with the second member,
the second member is a holding member configured to hold the bearing.

2. The motor according to claim 1, further comprising:
the first temperature sensor detects a temperature of the first member,
the second temperature sensor detects a temperature of the second member.

3. The motor according to claim 1, wherein
a shortest distance between the first temperature sensor and the bearing is greater than a shortest distance between the second temperature sensor and the bearing.

4. The motor according to claim 2, wherein
a thermal capacity of the first member and a thermal capacity of the second member.

5. The motor according to claim 2, wherein
a thermal conductivity of the first member is smaller than 1 (W/mK); and
a thermal conductivity of the second member is 10 (W/mK) or greater.

6. The motor according to claim 1, further comprising:
a third temperature sensor disposed at a third member inside the motor, wherein a third temperature sensor detects a temperature of the third member,
the first temperature sensor, the second temperature sensor and the third temperature sensor are directly connected to a motor controlling IC.

7. The motor according to claim 6, wherein
a shortest distance between the third temperature sensor and the stator is greater than a shortest distance between the second temperature sensor and the stator.

8. The motor according to claim 2, wherein
an output signal is output to outside of the motor, based on a detection result of the first temperature sensor and a detection result of the second temperature sensor.

9. The motor according to claim 2, wherein
a difference between a detection result of the first temperature sensor and a detection result of the second temperature sensor is output to outside of the motor.

10. A fan motor comprising:
an impeller; and
the motor according to claim 1.

* * * * *